(12) United States Patent
Topham

(10) Patent No.: US 7,562,248 B2
(45) Date of Patent: Jul. 14, 2009

(54) DATA STORAGE SYSTEM

(75) Inventor: Andrew Topham, Dursley (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 597 days.

(21) Appl. No.: 11/061,022

(22) Filed: Feb. 18, 2005

(65) Prior Publication Data

US 2005/0193237 A1    Sep. 1, 2005

(30) Foreign Application Priority Data

Feb. 18, 2004    (GB)    ................. 0403571.3

(51) Int. Cl.
    *G06F 11/00* (2006.01)
(52) U.S. Cl. .................................................. 714/6
(58) Field of Classification Search .................. 714/6
    See application file for complete search history.

(56) References Cited

U.S. PATENT DOCUMENTS

| | | | |
|---|---|---|---|
| 5,790,374 A | 8/1998 | Wong | |
| 5,871,264 A * | 2/1999 | Ohara | .................... 312/334.7 |
| 6,392,884 B1 | 5/2002 | Chou | |
| 6,445,587 B1 | 9/2002 | Pavol | |
| 6,874,100 B2 * | 3/2005 | Rauscher | ..................... 714/6 |
| 6,938,181 B1 * | 8/2005 | Talagala et al. | ................ 714/7 |
| 2001/0044877 A1 * | 11/2001 | Kanazawa et al. | .......... 711/111 |
| 2002/0162075 A1 * | 10/2002 | Talagala et al. | ............. 714/819 |
| 2002/0199129 A1 * | 12/2002 | Bohrer et al. | .................. 714/7 |
| 2003/0041283 A1 | 2/2003 | Murphy et al. | |
| 2003/0110330 A1 * | 6/2003 | Fujie et al. | .................... 710/36 |
| 2003/0131197 A1 * | 7/2003 | Morrison | .................... 711/130 |
| 2003/0134648 A1 * | 7/2003 | Reed et al. | .................. 455/456 |
| 2004/0057203 A1 | 3/2004 | Rabinovitz | |
| 2005/0028028 A1 * | 2/2005 | Jibbe | ............................. 714/6 |
| 2006/0041782 A1 * | 2/2006 | Ali et al. | ........................ 714/6 |

FOREIGN PATENT DOCUMENTS

| | | |
|---|---|---|
| EP | 0726521 A2 | 8/1996 |
| EP | 0780765 A2 | 12/1996 |
| GB | 2278228 A | 11/1994 |

OTHER PUBLICATIONS

GB Search Report dated Mar. 23, 2005.
Tatung Comp-Raid 7300 3U Disk Array Series Tatung Science and Technology <http://www.tsti.com/ftp/da7300.pdf>.
Search Report dated Sep. 9, 2004.
Search Report dated Jun. 28, 2004.
www.nexson.com/products/ATAbeasthi.pdf.
www.nexsan.com/news/111103.html.

* cited by examiner

*Primary Examiner*—Scott T Baderman
*Assistant Examiner*—Yair Leibovich

(57) ABSTRACT

A data storage system comprising an equipment rack having shelves for receiving trays, each tray carrying a plurality of data storage disks arranged as one or more modules. The equipment rack includes a maintenance controller, which is connectable to data storage disks of trays received in the shelves and is configured to transfer data stored on data storage disks of a first module to data storage disks of a second module whenever the first module is to be taken off-line.

22 Claims, 6 Drawing Sheets

DATA STORAGE SYSTEM

TECHNICAL FIELD

This invention relates to a data storage system and in particular to an equipment rack having shelves for receiving trays, each tray comprising a plurality of data storage disks.

CLAIM TO PRIORITY

This application claims priority to copending United Kingdom utility application entitled, "A DATA STORAGE SYSTEM," having serial no. GB0403571.3, filed Feb. 18, 2004, which is entirely incorporated herein by reference.

BACKGROUND

Large scale storage systems have traditionally been based on arrays of hard disks. These disks have a relatively high failure rate and, therefore, it is important that they can be quickly and easily replaced, especially for an on-line data storage system where the stored information is often required to be immediately accessible. For example, Enterprise-class data requires on-line access, high performance, high bandwidth, high availability and high throughput. 'Hot plug' technology has been developed to provide the above mentioned requirements together with easy disk replacement whilst the storage system is still active. This type of data storage technology, however, is very expensive and, therefore, is only appropriate for high value data that must be immediately accessible.

RAID (originally "Redundant Arrays of Inexpensive Disks", now "Redundant Arrays of Independent Disks) offers the ability to store data in arrays of disks, a data set being distributed over an array of disks by a RAID controller. RAID may be configured with parity such that it in the event of a failure of one of the disks in the array controlled by a RAID controller, the data on the failed disk can still be recovered from the remaining disks. RAID provides a method of accessing multiple individual disks as if the array were one large disk, spreading data access out over these multiple disks, thereby improving access times. By placing data on multiple disks, input/output (I/O) operations can overlap in a balanced way, improving performance.

Typically RAID is used in large file servers, transaction or application servers, where data accessibility is critical, and fault tolerance is required. RAID is also being used in desktop systems for computer aided design (CAD), multimedia editing and playback where higher transfer rates are needed.

Incorporation by reference is made to "A Case for Redundant Arrays of Inexpensive Disks (RAID)" by Patterson, Gibson and Katz as presented at ACM SIGMOD Conference, June 1998.

Whilst not within the scope of RAID, data can also be geographically distributed to remote arrays and storage systems spanning disk arrays and automated libraries of optical disks and tapes controlled by a RAID or RAID-like controller. Thus, the storage media to which data is distributed (and from which it is retrievable) need not be homogeneous.

An array of disks can also be provided without a RAID controller, being known as JBOD Oust a bunch of disks).

The disks have a fairly high failure rate so a high priority in the design of storage systems is to make replacement of failed disks quick and easy. This has led to the development of hot plug technology which allows a failed disk under a RAID controller to be physically replaced without requiring the other disks in the array to be taken off-line or powered down. Because of RAID's built-in fault tolerance/redundancy, upon failure of a disk, the data on the failed disk is recoverable from the remaining disks. The controller highlights the failed disk and calls for replacement which is effected manually by unplugging the failed disk from its mount and plugging in a fresh disk—also a hot plug disk.

Hot plugging works very well for on-line data and provides maximum data protection, performance and availability and is ideally suited to Enterprise-class data where the ready availability of the data is regarded as having high value.

As previously noted, any hot plug drive, in addition to the basic hard disk, must include a mechanical chassis including a back plane that provides for simple insertion and removal from a specially adapted and tailored slot in a hot plug storage array enclosure. Access to the enclosure, typically, in a standard data centre equipment 19" rack (such as the short standard rack shown in FIG. 1 of the accompanying drawings) is from the front of the rack to allow access to the disks and enable them to be taken out while the system is on-line. The disks each have a finger ring pull to allow them to be individually drawn out and extracted from the front of the rack. In practice, there is no standard design for these components such that each manufacturer devises their own design, making it essential that the manufacturer of the enclosure supplies the hot plug disks. This lack of standardisation reduces competition and economies of scale thereby inflating the price of the disks.

Referring to FIG. 2 of the accompanying drawings, this shows four hot plug disks in a JBOD array in a rack. Three hot plug disks have been removed from the array to expose the back plane electronics. Behind the back plane electronics are one or more power supply units. Referring to FIG. 3 of the accompanying drawings, the boundary of the hot plug disks and their associated electronics is shown by the dashed lines from which it will be appreciated that the disk array does not extend to the rear of the rack so that there is significant unused space toward the rear of the rack. This arrangement showing the unused space behind a hot plug disk array is also shown schematically in FIG. 4 of the accompanying drawings.

Many design constraints arise from the need to provide hot plug capability and all serve to increase costs. For example, the metal work design, locking mechanisms, interface design and back plane electronics are all determined by the necessity to have hot plug technology.

SUMMARY

A data storage system comprising an equipment rack having shelves for receiving trays, each tray carrying a plurality of data storage disks arranged as one or more modules. The equipment rack includes a maintenance controller, which is connectable to data storage disks of trays received in the shelves and is configured to transfer data stored on data storage disks of a first module to data storage disks of a second module whenever the first module is to be taken off-line.

BRIEF DESCRIPTION OF THE DRAWINGS

In order that the present invention may be more readily understood, embodiments thereof will now be described, by way of example only, with reference to the accompanying drawings, in which.

DETAILED DESCRIPTION

Figure 1:
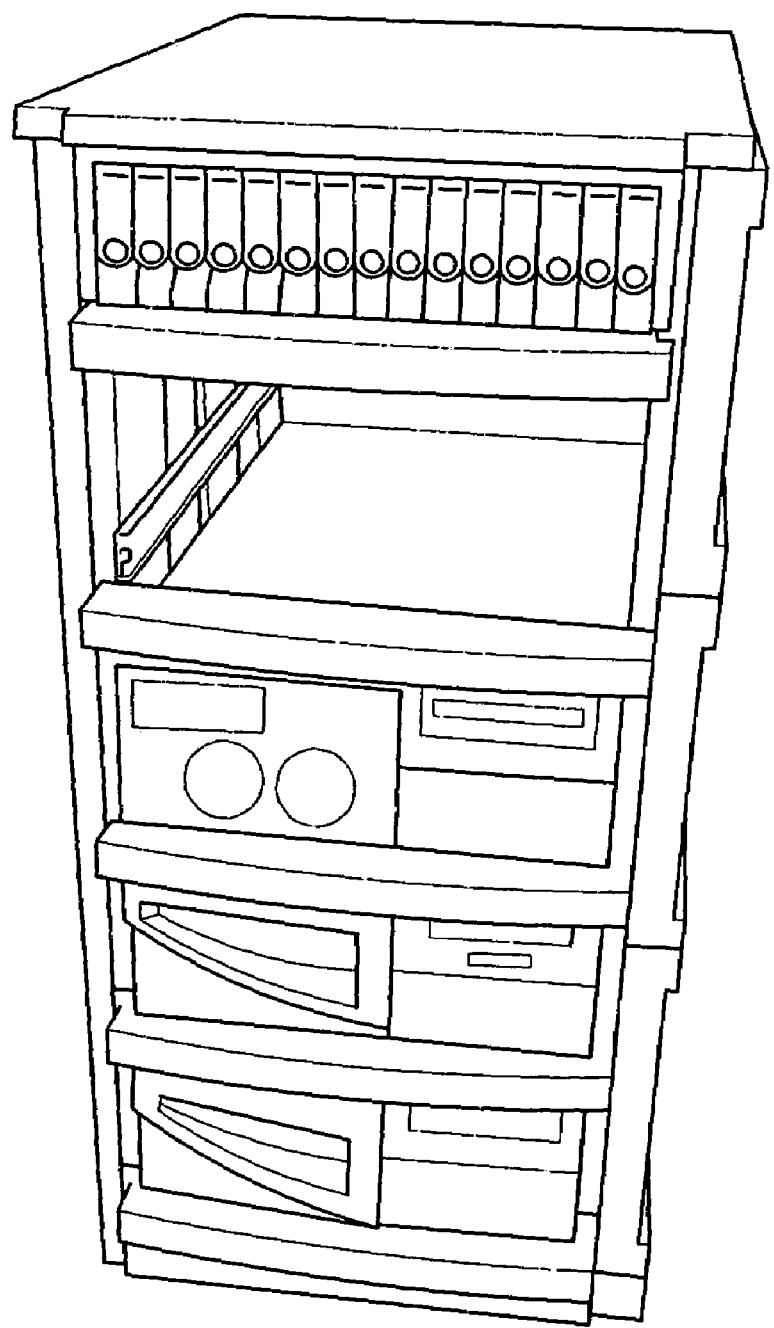
FIG. 1 is a perspective view of a short standard rack from the front of the rack housing three server computers and a hot plug disk array, the rack having one empty tray.
Figure 2:
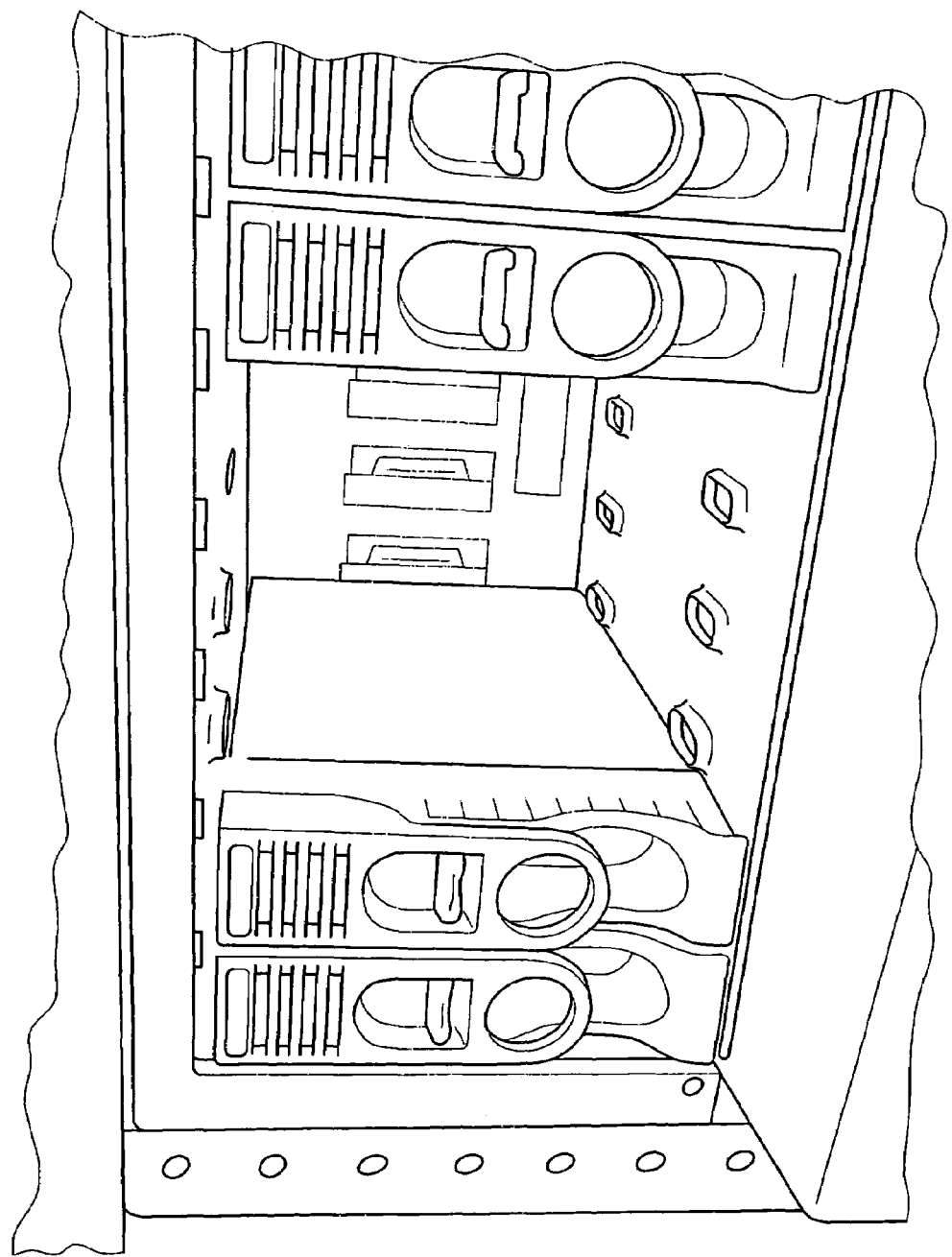
FIG. 2 is a perspective view of four hot plug disks of FIG. 1, three hot plug disks having been removed from the array to expose back plane electronics.
Figure 3:
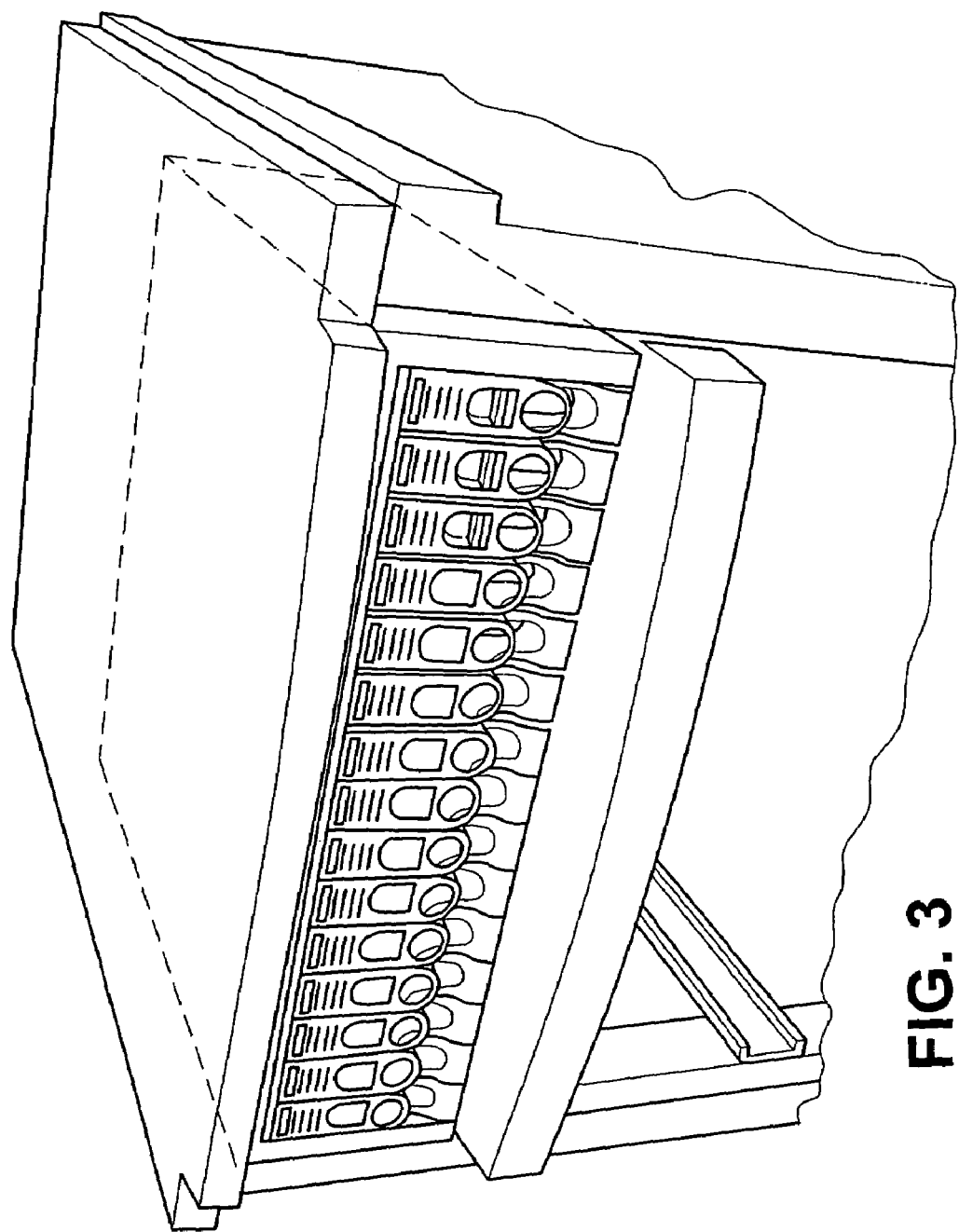
FIG. 3 is a perspective view of the disk array of FIG. 1 showing the hot plug disk array extending partway to the rear of the rack.
Figure 4:
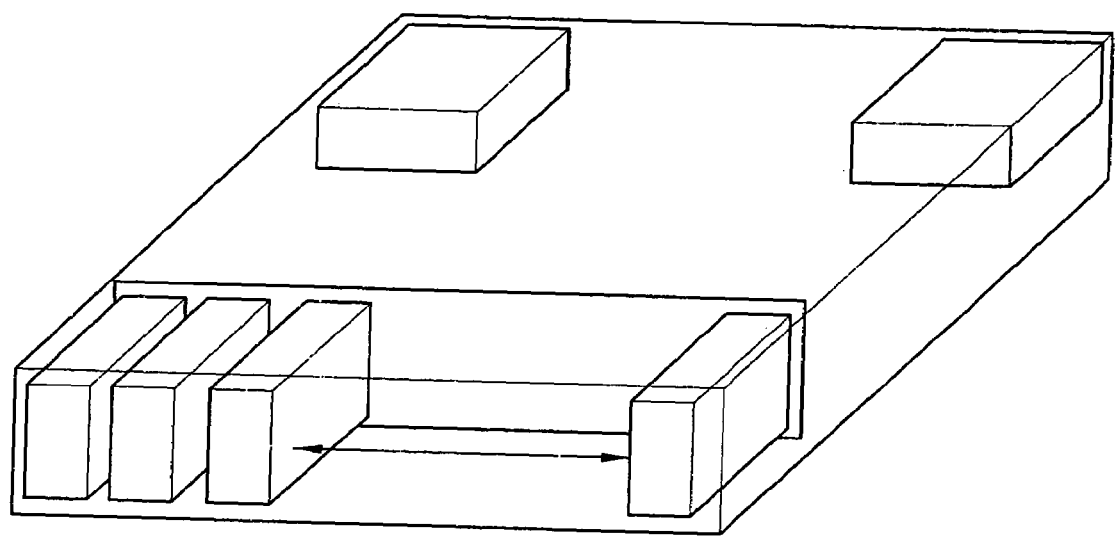
FIG. 4 is a schematic representation of a hot plug array tray, such as that shown in FIGS. 1 to 3.

One exemplary embodiment provides a tray for an equipment rack comprising: an array of non-hotplug data storage disks connectable to a maintenance controller, the array having at least three columns and at least three rows arranged as one or more modules.

In some embodiments, each module of the array has redundancy such that data is recoverable in the event of a failure of one of the data storage disks of a module.

In some embodiments, the data storage disks are directly connectable to the maintenance controller.

In other embodiments, the tray further comprises one or more module controllers, each module controller being connected to data storage disks of a respective module and being connectable to the maintenance controller.

Preferably, each module controller is configured to distribute data received from the maintenance controller over the data storage disks of the respective module.

In some embodiments, each module controller is configured to distribute data such that data stored on a particular data storage disk is additionally stored on at least one other data storage disk of the same module.

In some embodiments, each module controller is a RAID controller.

In some embodiments, the module controllers are located above the array of data storage disks.

In some embodiments, the array of data storage disks are arranged as three or more modules, each module having a module controller.

In some embodiments, the array has at least fifteen columns and at least four rows of data storage disks.

In some embodiments, the data storage disks have a form factor of 3.5".

In some embodiments, the tray is suitable for use with a standard 19" rack.

Another exemplary embodiment provides a tray for an equipment rack comprising: a module comprising an array of non-hotplug data storage disks for storing data and being connectable to a maintenance controller, wherein the array has m columns and n rows of data storage disks, where m and n are each two or more and neither m nor n is equal to two.

Another embodiment provides an equipment rack comprising: a plurality of shelves, each shelf configured to receive a tray comprising a module having an array of data storage disks; and a maintenance controller connectable to data storage disks of trays received in the shelves, wherein the maintenance controller is configured to transfer data stored on data storage disks of a first module to data storage disks of a second module whenever the first module is to be taken off-line.

In some embodiments, the maintenance controller is configured to transfer data from a first module of a first tray to a second module of a second tray whenever the first module is to be taken off-line.

In alternative embodiments, the maintenance controller may be configured to transfer data from a first module to a second module of the same tray whenever the first module is to be taken off-line.

In some embodiments, the second module is that module last brought online by the maintenance controller.

In some embodiments, each module has a unique identifier to allow the maintenance controller to identify and address each module.

In some embodiments, each module has a module controller and the maintenance controller is connectable to module controllers of trays received in the shelves.

In some embodiments, the rack is configured to enable each tray to be slid from its shelf to enable servicing of the data storage disks without disconnecting the maintenance controller from the data storage disks.

In some embodiments, the rack includes connecting cables for connecting the maintenance controller to each tray.

In some embodiments, the maintenance controller is configured to interface with non-hotplug data storage disks.

Another exemplary embodiment provides a maintenance controller for a data storage system having a plurality of trays, each tray comprising a module having an array of data storage disks, the maintenance controller being configured to: transfer data stored on data storage disks of a first module to data storage disks of a second module; taking the first module off-line from the data storage system to enable the data storage disks of the first module to be serviced; and putting the serviced first module back online.

Figure 5:
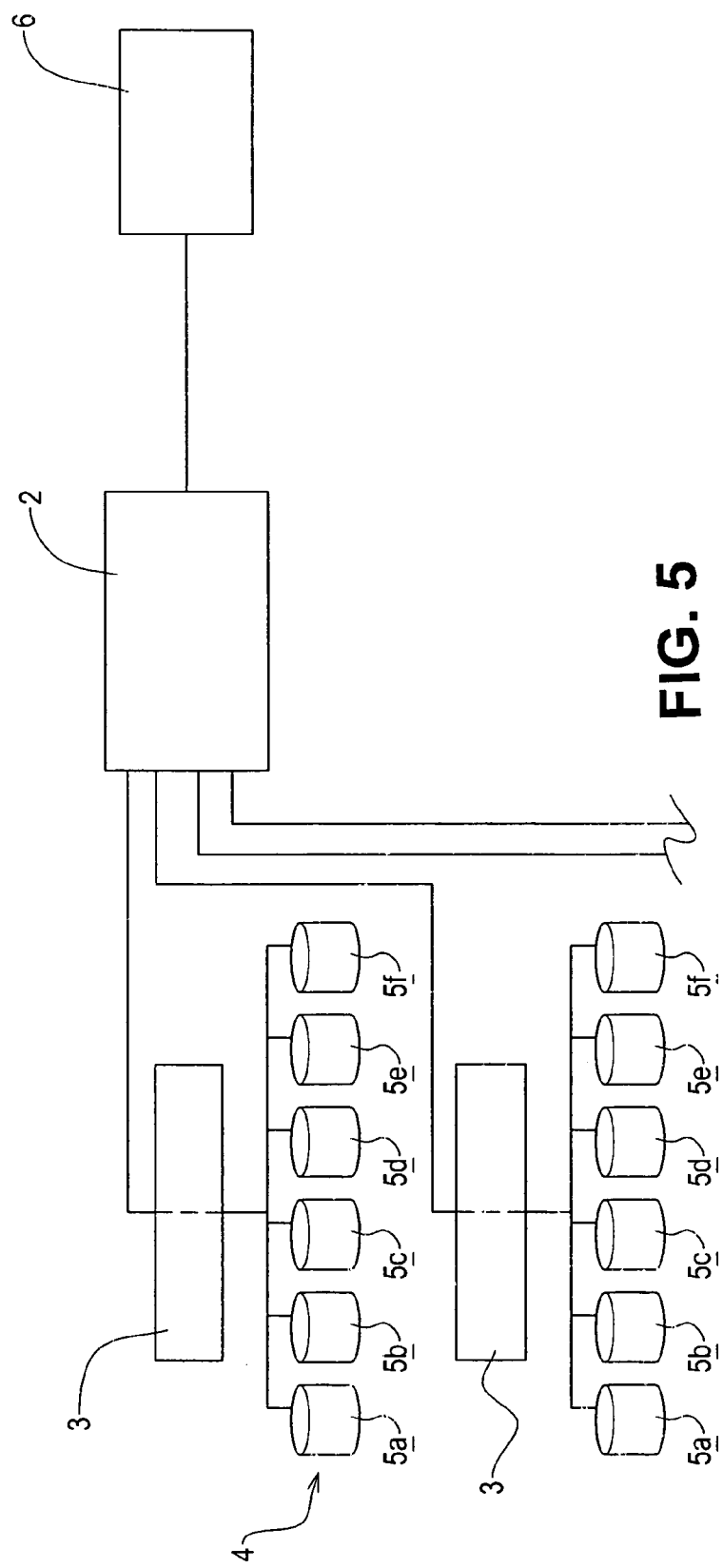
FIG. 5 is a block diagram of a data storage system embodying the present invention.

A data storage system 1 embodiment is shown in FIG. 5 and comprises a maintenance controller 2 through which data is passed to and received from the data storage system. The maintenance controller interfaces independently with a plurality of RAID controllers 3, controllers in the present example. It should be noted that the scope of the invention is not limited to RAID arrays but can equally be implemented using other suitable techniques for providing redundancy in data storage systems or, indeed, in a data storage system without redundancy between the data storage elements in the system.

In the example shown in FIG. 5, each of the RAID controllers 3 stripes data across an array 4 of six disks 5a, 5b, 5c, 5d, 5de and 5f, controlled thereby. In the present example, the RAID controller 3 stripes data across six disks. In accordance with the RAID algorithm, one of the disks 5 can be lost without affecting the ability of the RAID controller 3 to extract data from the disk array 4. The array 4 having so-called N+1 redundancy. Preferably, if complete data integrity is required, a back-up device 6 such as a back-up tape system or other storage facility is also connected to the maintenance controller 2. The back-up device 6 contains all the data present on the more readily accessible disk arrays 4 and is available to provide a back-up of the entire data on the arrays 4.

The storage system 1 is constructed from a two-level hierarchy of RAID storage controllers 3 and arrays 4 of hard disks 5. The storage controllers 3 are arranged with one maintenance controller 2 interfacing to multiple RAID controllers 3 as shown in FIG. 5. The maintenance controller 2 provides the ability to take the RAID controller 3 and its associated array 4 off-line from the maintenance controller so that preventative maintenance may be performed because, as the disks 5 in the arrays 4 in embodiments of the present invention are not hot plug disks, preventative maintenance must be carried out with the array 4 off-line. When off-line, an array 4 can also be physically disconnected from the maintenance controller. But, before any servicing or replacement of disks in an array is undertaken, the array should be off-line at the least and preferably physically disconnected from the maintenance controller 2. It is envisaged that each array 4 of disks 5 with a RAID controller 3 has a unique identifier to allow the maintenance controller 2 to identify and address each array 4 for the purposes of distributing data to and reading data from respective arrays but also to allow designated arrays to be taken off-line, preferably in accordance with a maintenance schedule.

The disks are arranged into multiple arrays and are high volume low cost standard form factor disks typically 3.5" disk drives that can be implemented in other hard disks. The interface cabling leads directly from the RAID controller 3 to each disk 5 thereby minimising costly interconnects such as the hot plug interconnects, i.e., not hot plug. The interface architecture is preferably a low cost interface such as ATA or any other suitable interface. It should be appreciated that whilst this example of the invention relates to disks as the data storage medium, there are alternatives such as tape drives, solid state memory devices, optical disks or any other suitable data storage medium. The storage system is particularly well suited to the long term storage of data such as personal digital images for web access by individuals. Such a system would be too expensive to maintain on-line over a long time period using hot plug technology and so the storage system 1 embodying the present invention without use of hot plug technology provides a cheaper data storage option in which the images can be stored for long time periods but accessed only infrequently.

The storage system 1 described above is configured as a RAID array requiring the presence of a RAID controller card for each array 4 of disks 5. The storage system 1 can also be configured as just a bunch of disks (JBOD) thereby dispensing with the RAID controller 3. Each such array 4 is connected directly to the maintenance controller 2 (as shown by the dashed lines in FIG. 5). By configuring the data storage system as a JBOD array, or plurality of JBOD arrays, a certain amount of space is saved in a cabinet holding such arrays since head space required to locate and store a RAID controller card is not required.

One of the advantages of such embodiments of the invention arises from the ability to dispense with the costs associated with hot plug technology and to utilise a maintenance schedule rather than replacing or repairing devices on demand. The first part of the saving comes from the hardware that is built into a hot plug drive. As previously noted, any hot plug drive, in addition to the basic hard disk, must include a mechanical chassis that provides for simple insertion and removal from a slot in a storage array enclosure. In practice, there is no standard design for these components such that each manufacturer devises their own design, making it essential that the manufacturer of the enclosure supplies the hot plug disks. This lack of standardisation reduces competition and economies of scale, thereby inflating the price of the disks.

The second part of the saving comes from dispensing with the hot plug technology in the storage array enclosure. Many design constraints arise from the need to provide hot plug capability, and all serve to increase costs. For example, the metal work design, locking mechanisms, interface design and back plane electronics are all determined by the necessity to have hot plug technology. Embodiments of the invention do not, however, use hot plug technology. Indeed, the disk arrays 4 used in the invention are specifically not hot plug disks and cannot, therefore, be individually replaced whilst the remainder of the array 4 stays on-line. Any replacement of failed disks in the storage system 1 embodying the present invention requires the affected array 4 of disks 5 to be taken off-line, the failed disk replaced and the array to be brought back on-line.

In addition to the above savings derived from not using hot plug technology, other embodiments of the present invention allow the physical layout of the disk array to be improved and made denser since there is no requirement for front access for an array embodying the present invention since there is no reliance on hot plug technology. In the absence of back plane electronics and the mechanical infrastructure required to implement a hot plug design, a JBOD disk array is provided in which the disks are located as an array of m rows and n columns, where m and n are each 2 or more, and preferably 3 or more. In this arrangement, one row of disks is located behind another—an impossibility with hot plug designs where all disks must be accessible from the front of the equipment rack.

Figure 6:
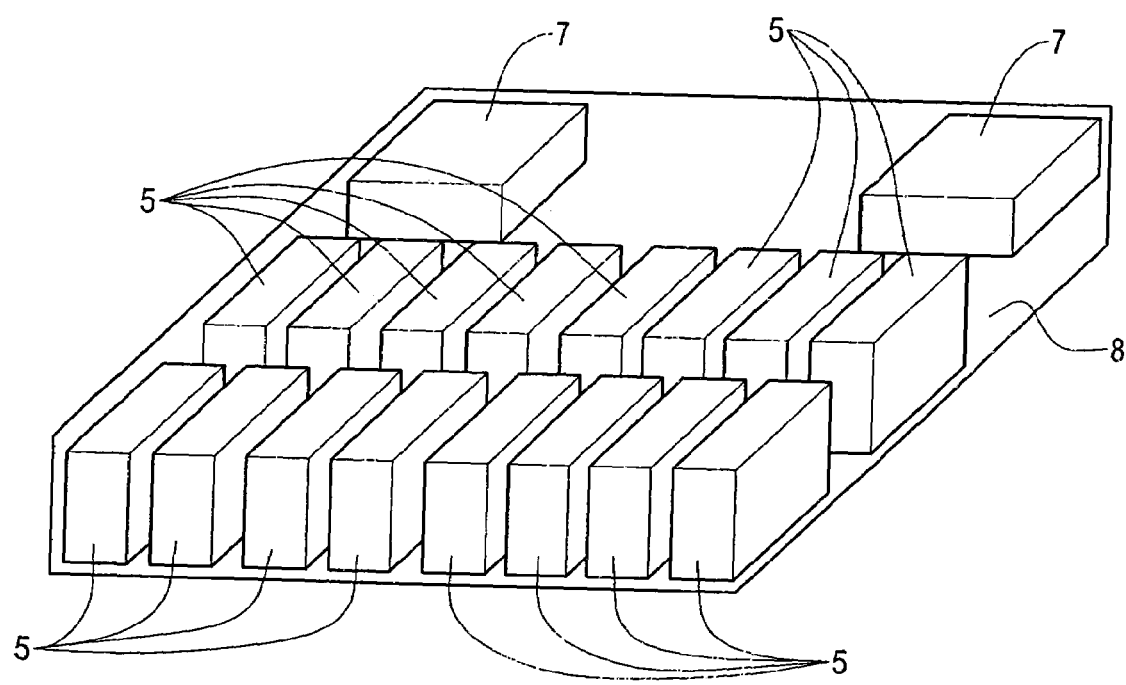
FIG. 6 is a schematic representation of a disk array tray embodying the present invention for use in the data storage system of FIG. 5.

Reference is now made to FIG. 6 which shows a disk array embodying the present invention. The array is configured as two rows of eight disks 5 behind which are located a pair of power supply units 7 for the disks 5. This is not the most dense disk array that can be provided in a standard 19" rack tray or drawer. It has been determined that an array of four rows of fifteen disks 5 would be possible. This level of improvement in array density is simply not possible using hot plug technology. This JBOD array can also be configured as an equally dense RAID array. In the corresponding RAID array, the RAID controller card is fitted above the disk array necessitating a slight increase in head space above the disks to accommodate the card.

The JBOD or RAID disk array is conveniently provided on a tray or drawer 8 in the standard 19" racking with each of the disks being connected through the tray to the maintenance controller so that the entire tray can be physically disconnected therefrom in the manner earlier described and each or selected ones of the disks on the disconnected tray can then be serviced or replaced as necessary or as dictated by a maintenance schedule. In most circumstances, servicing or repair can also be carried out more simply by taking the array 4 off-line from the maintenance controller 2 under the control of the maintenance controller without physically disconnecting the array from the maintenance controller. A connecting cable or series of cables from the array 4 connected to the maintenance controller would accommodate sufficient slack to allow a tray on which the disk array is located to be slid from its storage condition. Preferably, a standard equipment rack houses a plurality of trays 8, each tray 8 carrying one or more modules, and also houses the maintenance controller to which the modules are connectable.

Data storage systems embodying the present invention are particularly well suited to certain types of data where there is a higher degree of acceptance of any delay in recovering the stored data. In an ideal case, stored data is available from an array that is protected by the RAID 5 algorithm. A less ideal case is if one of the disks 5 in the array 4 has failed in which case the data can still be recovered from the array since the array 4 can afford to lose one disk because of the arrays N+1 redundancy under the RAID 5 controller 3. In this case, the data is delivered within the same time frame as if all disks had been functioning correctly. If two or more disks 5 fail within one array 4 then the data cannot be covered from the array 4. This data must be recovered from the backup tape system 6 or other storage facility or backup device linked to the maintenance controller 2. It is also possible to distribute data from one disk in an array over other disks in other arrays within the same system so that data is recoverable in the event of a failure of one of the disks in an array from at least one other disk in the system.

The maintenance controller 2 includes a computer program to control and implement a preventative maintenance algorithm that rotates a single array 4 to be isolated from the data storage system 1 by being taken off-line on a scheduled basis, for example, on a maintenance interval of once a day. Taking an array off-line involves redistributing the data from the array to be taken off-line to one or more other arrays, preferably to the immediately last maintained array.

Since the arrays 4 and the disks 5 in the arrays are specifically not hot plug enabled, an array can only be disconnected from the maintenance controller after having been taken off-line from the data storage system 1. An array 4 cannot be disconnected from the data storage system 1 when the array is on-line with the maintenance controller.

Once an array is taken off-line, it can be isolated from the data storage system 1 and a maintenance technician can disconnect the array or specified disks 5 in the off-line array and service or replace any disk mechanisms or other components in the array that have been found to be faulty or are indicated by the maintenance schedule as being due for replacement prior to potential failure. Once an array has been maintained, it is reconnected, if necessary, and brought back on-line. The maintenance controller 2 will then start to use the capacity of this now maintained array. Then, the next array to be maintained is prepared to be taken off-line. In this regard, there are sufficient numbers of arrays 4 available such that the entire data set stored on the arrays 4 will fit onto at least one less than the total number of arrays 4, i.e., each array has a data storage capacity of S and there are N arrays so the data storage system has a capacity of $(N-1)*S$. Thus, the system is maintained without affecting the operation and performance of the system which is still available for interrogation or to be written to despite not using hot plug technology.

The data storage system 1 is left to operate as long as possible without maintenance. Maintenance intervals are determined and scheduled by a statistical analysis so that maintenance is delayed for as long as reasonably possible whilst offering a very high level of data availability—but not perfect data availability. The maintenance protocol for maintaining the data storage system 1 embodying the present invention requires that faults are not fixed as they occur but are instead dealt with on a regular maintenance program. If a fault occurs, then the array 4 carries on working and is still able to make data available on that array even with one failed disk if RAID or some other redundancy system is used. If a fault in another disk 5 occurs, then the array simply fails as each RAID array only has N+1 redundancy. The type of data stored on the data storage system is selected so as not to be critical if access is prevented because of the failure of an array. In the event of a dual failure from which the N+1 redundancy cannot recover, then the data on the array is recovered from the aforementioned back-up device 6 such as a back-up tape system or other storage facility connected to the maintenance controller 2.

It is envisaged that a data storage system embodying the present invention would be provided in a standard computer rack system typically having up to fifteen shelves each shelf accommodating an array of up to fifteen disks 5 across by four deep meaning up to fifteen arrays 4, each array 4 having sixty disks 5, in each system. Each disk 5 has a storage capacity of, for example, 100 gigabytes. Each such data storage system 1 has therefore a storage capacity, before allowing for parity and data movement space of 90 terabytes ($4*15*15*100$ Gb) although of course other configurations fall within the scope of the invention allowing variations in the number of racks, arrays in a rack and disks in an array so as to provide a data storage system with any desired capacity. The system can also be implemented with each shelf of a rack comprising one array 4 having a RAID 5 controller 3 for and on each shelf or tray within the rack.

The array 4 of data storage disks 5 provided on each tray 8 may be arranged as one or more modules, each module having at least N+1 redundancy. Each module preferably includes a module controller, such as a RAID controller 3, which distributes data received from the maintenance controller 2 over the data storage disks 5 of the respective module. Each tray 8 is therefore capable of supporting multiple RAID sets. In particular, each tray 8 may comprise more than two RAID controllers 3.

The connections between the array 4 of data storage disks 5 or the module controllers of each tray 8 and the maintenance controller 2 are preferably configured (e.g., the cabling between each tray 8 and the maintenance controller 2 is of sufficient length) to permit each tray 8 to be slid-out from its shelf of the equipment rack such that the data storage disks 5 of a module can be taken off-line and serviced or replaced, whilst the data storage disks of the other modules of the tray remain online. Moreover, the maintenance controller 2 may be configured to transfer data from a module to be serviced to a module of the same tray 8, which is to remain online.

Where the data storage system uses disk arrays, the disks 5 are preferably ATA but can also be SCSI, SATA, SAS or Fibre Channel disks.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A tray for an equipment rack comprising:
   an array of non-hotplug data storage disks connectable to a maintenance controller, the array having at least three columns and at least three rows arranged as one or more modules,
   wherein the maintenance controller is configured to transfer data stored on data storage disks of the array of non-hotplug data storage disks to one or more other arrays of data storage disks whenever the array of non-hotplug data storage disks is being prepared to be taken off-line.

2. A tray according to claim 1, wherein each module of the array has redundancy such that data is recoverable in the event of a failure of one of the data storage disks of the module.

3. A tray according to claim 1, wherein the data storage disks are directly connectable to the maintenance controller.

4. A tray according to claim 1, wherein the tray further comprises one or more module controllers, each module controller being connected to data storage disks of a respective module and being connectable to the maintenance controller.

5. A tray according to claim 4, wherein each module controller is configured to distribute data received from the maintenance controller over the data storage disks of the respective module.

6. A tray according the claim 5, wherein each module controller is configured to distribute data such that data stored on a particular data storage disk is additionally stored on at least one other data storage disk of the same module.

7. A tray according to claim 5, wherein each module controller is a RAID controller.

8. A tray according to claim 4, wherein the module controllers are located above the array of data storage disks.

9. A tray according to claim 4, wherein the array of data storage disks are arranged as three or more modules, each module having a module controller.

10. A tray according to claim 1, wherein the array has at least fifteen columns and at least four rows of data storage disks.

11. A tray according to claim 1, wherein the data storage disks have a form factor of 3.5".

12. A tray for an equipment rack comprising:
   a module comprising an array of non-hotplug data storage disks for storing data and being connectable to a maintenance controller,
   wherein the array has m columns and n rows of data storage disks, where m and n are each greater than two,
   wherein the maintenance controller is configured to transfer data stored on data storage disks of the array of non-hotplug data storage disks to one or more other arrays of data storage disks whenever the array of non-hotplug data storage disks is being prepared to be taken off-line.

13. An equipment rack comprising:
   a plurality of shelves, each shelf configured to receive a tray comprising a module having an array of data storage disks; and
   a maintenance controller connectable to data storage disks of trays received in the shelves,
   wherein the maintenance controller is configured to transfer data stored on data storage disks of a first module to data storage disks of a second module whenever the first module is to be taken off-line.

14. An equipment rack according to claim 13, wherein the maintenance controller is configured to transfer data from the first module of a first tray to the second module of a second tray whenever the first module is to be taken off-line.

15. An equipment rack according to claim 13, wherein the maintenance controller is configured to transfer data from the first module to the second module of the same tray whenever the first module is to be taken off-line.

16. An equipment rack according claim 13, wherein the second module is that module last brought online by the maintenance controller.

17. An equipment rack according to claim 13, wherein each module has a unique identifier to allow the maintenance controller to identify and address each module.

18. An equipment rack according to claims 13, wherein each module has a module controller and the maintenance controller is connectable to module controllers of trays received in the shelves.

19. An equipment rack according to claim 13, wherein the rack is configured to enable each tray to be slid from its shelf to enable servicing of the data storage disks without disconnecting the maintenance controller from the data storage disks.

20. An equipment rack according to claim 13, wherein the rack includes connecting cables for connecting the maintenance controller to each tray.

21. An equipment rack according to claim 13, wherein the maintenance controller is configured to interface with non-hotplug data storage disks.

22. A maintenance controller for a data storage system having a plurality of trays, each tray comprising a module having an array of data storage disks, the maintenance controller being configured to: as preparation for taking the first module off-line, transfer data stored on data storage disks of a first module to data storage disks of a second module; take the first module off-line from the data storage system to enable the data storage disks of the first module to be serviced; and put the serviced first module back online.

* * * * *